United States Patent [19]

Wilson et al.

[11] Patent Number: 5,555,288
[45] Date of Patent: Sep. 10, 1996

[54] VOICE PROCESSING SYSTEM WITH A CONFIGURABLE TELEPHONE LINE INTERFACE

[75] Inventors: James A. Wilson, Arlington; Mark Kayserman, Canton; Keith H. Angelini, North Billerica, all of Mass.

[73] Assignee: Voicetek Corporation, Chelmsford, Mass.

[21] Appl. No.: 227,307

[22] Filed: Apr. 12, 1994

[51] Int. Cl.⁶ .................................................. H04M 1/64
[52] U.S. Cl. .............................. 379/67; 379/229; 379/102
[58] Field of Search .................................. 379/67, 88, 89, 379/12, 16, 17, 93, 97, 102, 229

[56] References Cited

U.S. PATENT DOCUMENTS

| | | | |
|---|---|---|---|
| 4,506,358 | 3/1985 | Montgomery | 370/60 |
| 4,945,554 | 7/1990 | Krause et al. | 379/10 |
| 5,012,511 | 4/1991 | Hanle et al. | 379/201 |
| 5,018,137 | 5/1991 | Backes et al. | 370/85.13 |
| 5,060,255 | 10/1991 | Brown | 379/67 |
| 5,077,822 | 12/1991 | Waldroup | 455/34 |
| 5,163,080 | 11/1992 | Amoroso et al. | 379/89 |
| 5,247,514 | 9/1993 | Matsuda et al. | 370/61 |
| 5,260,990 | 11/1993 | Melampy et al. | 379/88 |

FOREIGN PATENT DOCUMENTS

| | | |
|---|---|---|
| 0255325 | 7/1987 | European Pat. Off. . |
| 0540253A2 | 10/1992 | European Pat. Off. . |
| 2243517 | 4/1991 | United Kingdom . |

*Primary Examiner*—Jeffery Hofsass
*Assistant Examiner*—Fan Tsang
*Attorney, Agent, or Firm*—Banner & Allegretti, Ltd.

[57] ABSTRACT

An electronic voice response system includes an interface unit which couples the voice response system to a plurality of trunk groups, each including a plurality of telephone lines, which are each characterized by a set of operating parameters. The system additionally includes a control unit which is responsive to commands by an administrator of the system, for assigning configuration files which contain predefined sets of configuration values which correspond to the set of operating parameters to selected trunk groups. The control unit is additionally responsive to commands by the administrator for individually altering selected configuration values and for generating new state definitions for a particular trunk group. The control unit generates a state machine for each trunk group according to the assigned configuration file and responds to events received over each telephone line in accordance with the definition contained in a corresponding state machine.

23 Claims, 5 Drawing Sheets

Microfiche Appendix Included
(1 Microfiche, 81 Pages)

VOICE PROCESSING SYSTEM WITH A CONFIGURABLE TELEPHONE LINE INTERFACE

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

MICROFICHE APPENDIX

This specification includes a microfiche appendix which consists of one microfiche consisting of 81 frames.

FIELD OF THE INVENTION

This invention relates generally to electronic voice processing systems and, more particularly, though in its broader aspects not limited to, methods and apparatus for configuring an electronic voice processing system to allow it to communicate with a variety of different types of telephone lines and systems.

BACKGROUND OF THE INVENTION

Electronic voice processing systems, also commonly known as voice response systems, voice messaging systems, or voice store and forward systems, operate to store, retrieve or otherwise manipulate data, be it voice or otherwise transmitted via a telephone network which commonly takes the form of a Public Switched Telephone Network (PSTN). Such systems may be coupled either directly to phone lines which connect to a Central Office of the PSTN, or indirectly, via an intermediate switching type of mechanism, such as a Private Branch Exchange (PBX) utilized by many organizations to route telephone calls, either incoming or outgoing, and to provide a variety of other functions.

In order to communicate with telephone lines coupled directly to a PSTN or indirectly via an intermediate switch, an electronic voice processing system must be configured to receive and transmit the necessary signals in an order and manner defined either by the PSTN or by the intermediate switch. For example, in order to establish a connection between a calling party and a called party, both parties, be they humans or machines, need to utilize compatible protocols. In many countries such as the United States, devices operating over the PSTN must conform to established standards and operate via established protocols in order to operate effectively. However, even within the United States, a number of different protocols exist for establishing a connection with a Central Office. Intermediate switching mechanisms such as PBX type switches present additional, different protocols.

As noted above, an electronic voice processing system must be configured with the protocol of each type of telephone line to which the system is connected. If multiple lines are connected to the system and if the lines operate under more than one protocol, the system must be configured with the protocol of each of the connected lines. If the type of lines connected to the system are changed, for example by changing the type of intermediate switch to which the system may be connected, then the configuration of the system must be changed to adhere to the requirement of the new type of lines. Changing such a configuration is often a time consuming and difficult process which may require the skills of a person with a specialized knowledge of telephone systems and of the particular type of electronic voice processing system. If the administrator of the electronic voice processing system does not have the required knowledge then the supplier of the system may have to dispatch qualified personnel, sometimes upon very short notice, to reconfigure the system on site in a manner to operate with the connected telephone lines. Such a procedure often is expensive and time-consuming and may result in extended down-time of the voice processing system in question.

Accordingly, it is an object of the present invention to provide a mechanism which allows rapid and simple reconfiguration of a voice processing system in order to enable the system to operate with a plurality of different telephone lines and switching equipment.

It is a further object of the present invention to enable such reconfiguration from a location remote from the voice processing system.

It is a further more specific object of the present invention to enable reconfiguration of a voice processing system via predefined sets of configuration parameters and protocol descriptions selectable by an administrator of the voice processing system.

It is a further specific object of the present invention to enable such reconfiguration via entry of values for selected configuration parameters into a text file on a digital computer.

SUMMARY OF THE INVENTION

In accordance with the present invention, the above objects are achieved in an electronic voice response system which includes an interface unit coupled to one or more trunk groups which each comprise a plurality of channels. Each trunk group operates in accordance with a set of operating parameters. A control unit within the voice response system comprises a trunk type configuration file, corresponding to each unique set of operating parameters, which contains values corresponding to certain operating parameters for the trunk group. A server process operating within the control unit is responsive to values contained in the configuration files and to events received over the channels, and responds to the events in accordance with the values.

An advantage of at least certain preferred embodiments is that the voice response system may be easily configured to communicate with different types of telephone lines and different types of switching equipment. Flexibility of the system is enhanced, and system operation costs and downtime are reduced. Such a system enables users to relatively freely use such a system with a multitude of different types of lines and switching equipment, without experiencing the delays and costs associated with having a trained service person reconfigure the system. Such an advantage also affects vendors of such systems who do not have to incur the cost and time associated with either sending trained personnel to sometimes distant customer sites or having to maintain such personnel at geographically diverse locations.

The trunk type configuration files advantageously take the form of text files, thus allowing rapid modification. An additional advantage of certain embodiments is that the configuration files may be created and modified remotely via a computer type terminal and a modem. Consequently, such systems may be configured by the remotely located vendor or other remotely located personnel if required.

In a certain embodiment the voice response system contains predefined sets of commonly used configuration parameters which are selectable by the administrator. Such embodiments further simplify the configuration procedure.

These and other features and advantages of the present invention may be better understood by considering the following detailed description of certain preferred embodiments of the invention. In the course of this description, reference will be made to the attached drawings.

DETAILED DESCRIPTION

Figure 1:
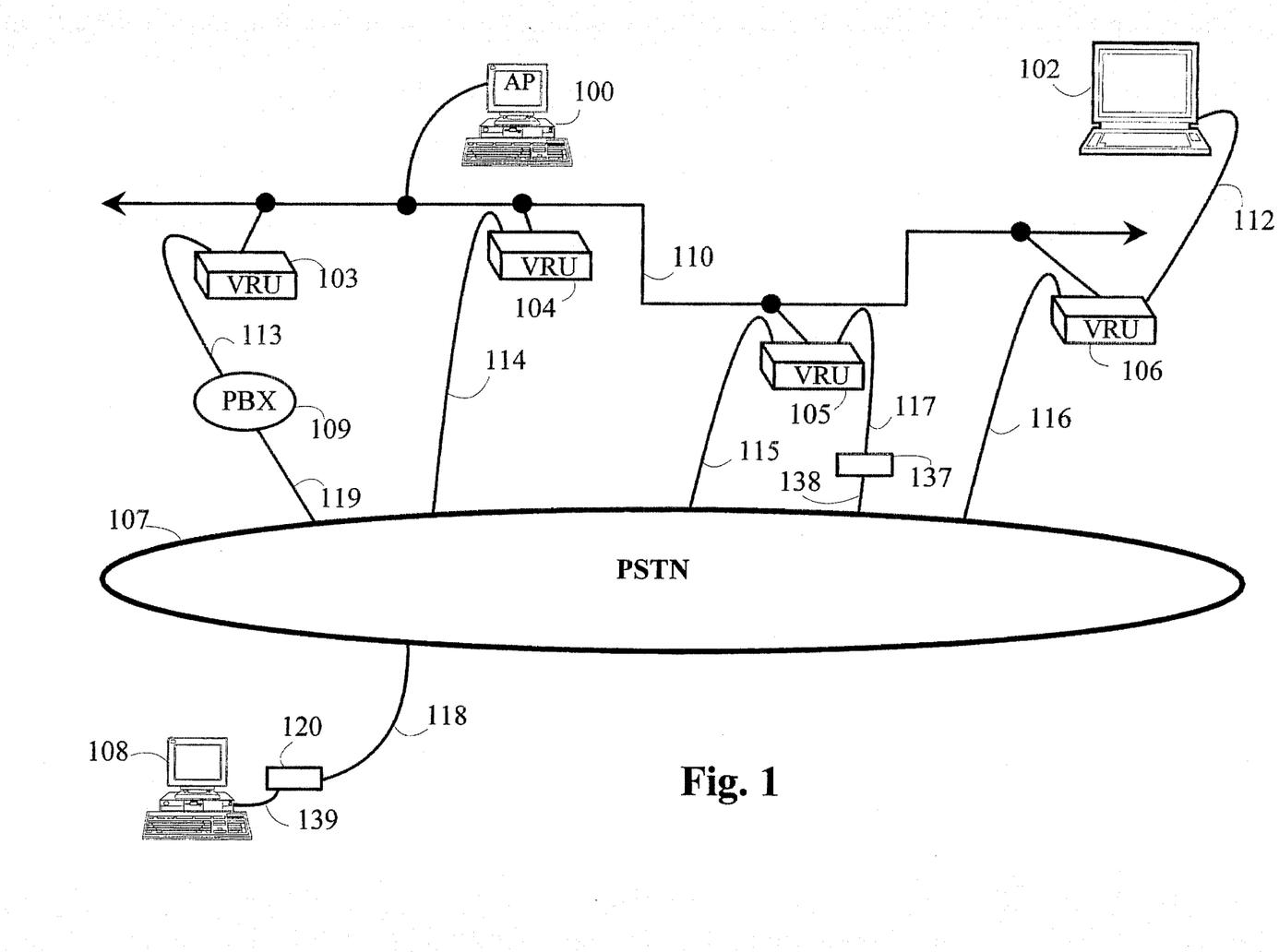
FIG. 1 is a schematic illustration of a system embodying the principles of the invention.

FIG. 1 of the drawings is a schematic illustration of a system embodying the principles of the invention. A plurality of Voice Response Units (VRUs) 103, 104, 105 and 106 are coupled to a Public Switched Telephone Network 107. As used herein, the term voice response unit (VRU) refers to systems which generally receive information in the form of voice or otherwise and which respond by performing certain functions such as providing information, storing information or other manipulation, storage or retrieval functions. Such systems include systems known as voice response systems which provide either pre-recorded information or selective computer data over telephone lines, and also systems known as voice store and forward or voice messaging systems which allow voice to be digitally encoded, sent to storage devices and later forwarded to a recipient. U.S. Pat. No. 4,663,777 to Szeto entitled Apparatus for Controlling Digital Voice Recording and Playback Over Telephone Liness and Adapted for Use With Host Computers describes a voice response unit and is hereby incorporated by reference. VRUs 104–106 are each coupled to PSTN 107 via a plurality of telephone lines, 114, 115 and 116. In the present specification, telephone lines 113–116 which couple a VRU to the PSTN or to PBX 109 are hereinafter referred to as trunk lines. VRU 103 is coupled to PSTN via an intermediate switch 109 which may take the form of a Private Branch Exchange (PBX) type of switch or other similar forms of switches which operate to provide access to the PSTN to a plurality of telephone lines located at a private site. PBX 109 is coupled to PSTN 107 via a plurality of telephone lines 119. VRU 103 is preferably coupled to PBX 109 via a plurality of trunk lines 113.

Each of the VRUs 103–106 are coupled to a local area network 110 of a known type which in a preferred embodiment takes the form of an Ethernet type network as described in IEEE Standard 802.3. The Ethernet type network 110 is of known type and may support a plurality of devices which perform various types of data processing tasks.

An application processor (AP) 100, which is coupled to the local area network 110 operates to perform various system management functions for selected VRUs. Application processor 100 preferably takes the form of a general purpose digital computer which runs the UNIX® operating system and a plurality of application programs which control call flow over the telephone lines as well as perform a variety of management and configuration tasks, to be described, for each of the VRUs connected to the network 110.

Application processor 100 preferably functions primarily to provide the control flow for telephone calls which are being processed by each VRU. For example, when a VRU is being used to provide an information retrieval service, AP 100 is notified of each incoming call and the digits the caller dials in response to an initial voice prompt requesting the topic number on which information is desired. AP 100 determines which voice or fax file on the VRU contains the information the caller has requested and instructs the VRU to play or fax the requested file to the user. In a more complex service, AP 100 may be required to make a large number of decisions during the course of a call to meet the needs of the caller.

VRU 106 is preferably coupled via a serial RS-232 type communications link 112, as is defined by the American Electrical Industries Association, to a data entry and display terminal 102. Terminal 102 may take the form of a "dumb" terminal which operates only to receive data via a keyboard, display data via a visual cathode ray tube type of display and receive and transmit data via communications link 112 which takes the form of an RS-232 type link. Alternatively terminal 102 may take the form of a general purpose data processor which performs other data processing functions in addition to acting as a data entry and display terminal.

Application processor 100 and data terminal 102 each operates as a command input unit to interact with a supervisory system control unit located in the VRU to which the command input unit is coupled. Data terminal 102 operates as a command input unit to interact with the system control unit contained in VRU 106 and AP 100 operates, with the benefit of a terminal emulator, as a command input unit to interact individually with the system control units contained in VRUs 103–105. AP 100 may also act as a command input unit to VRU 106. Consequently, as seen in FIG. 1, a particular command input unit may serve as the command input unit for a plurality of VRUs. The system control unit in each VRU operates to receive data and commands from the command input unit coupled to the VRU, process the commands and data, and to transmit information indicative of VRU operation and configuration to the corresponding command input unit.

As further seen in FIG. 1, data processor 108 is coupled to PSTN via a telephone line 118 and 139 and Modulator-DEModulator (Modem) unit 120 which operates in a conventional manner to transfer information between data processor 108 and a remotely located VRU 105 via PSTN 107 and modem 137 and telephone lines 117 and 138. As will be explained, data processor 108 may advantageously be used as a remotely located command input unit to provide commands and data to VRU 105 and receive information from VRU 105.

Figure 2:
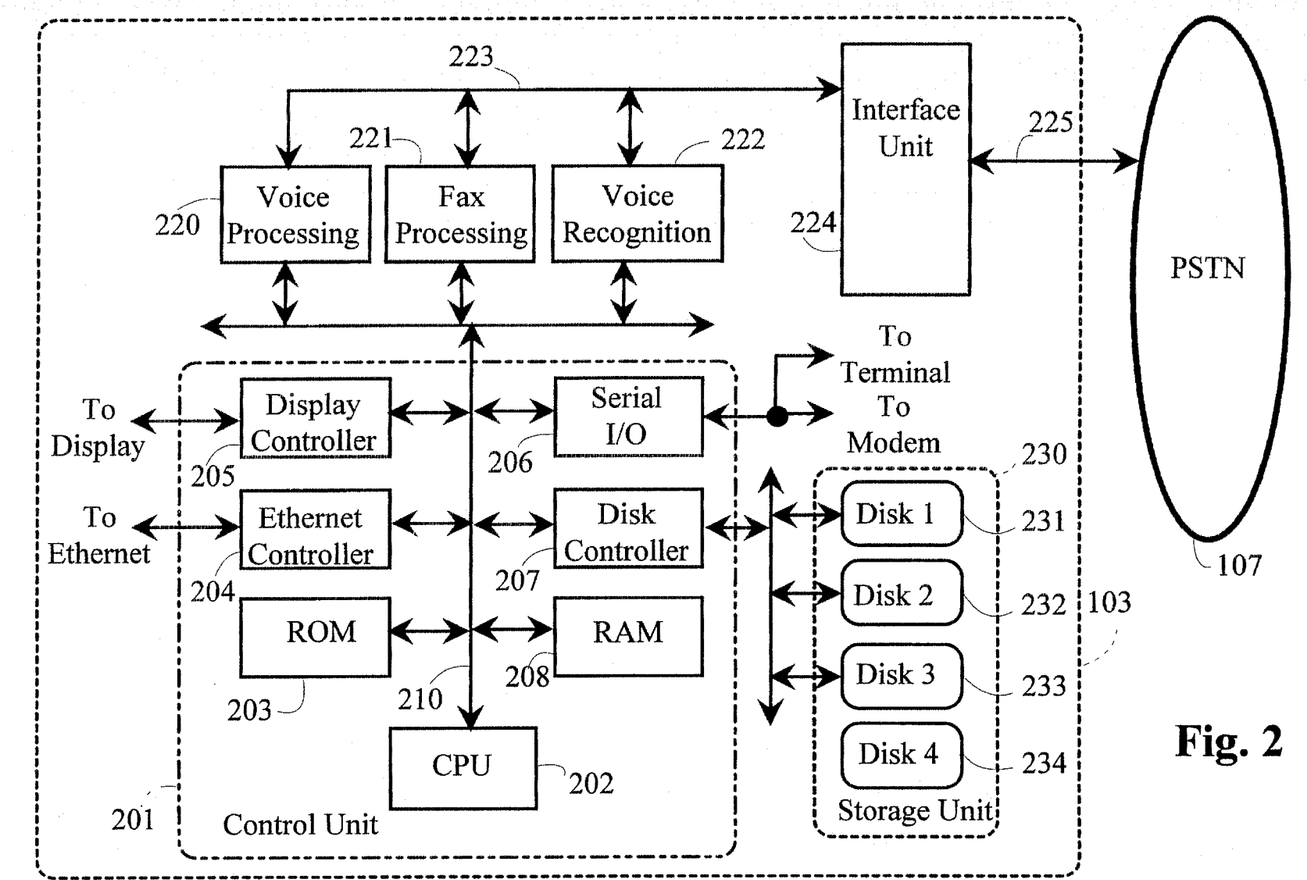
FIG. 2 is a block diagram of a preferred embodiment of the invention.

FIG. 2 of the drawings is a block diagram of VRU 103. VRUs 104, 105, and 106 may preferably take a similar form. Each VRU 103–106 preferably takes the form of a VTK type voice processing system supplied by Voicetek Corporation, Chelmsford, Mass. 01824. As seen in FIG. 2, an interface unit 224 is coupled to a PSTN 107 via a plurality of trunk lines seen at 225. In a preferred embodiment, each interface unit 224 may be coupled to PSTN 107 via up to 48 trunk lines. In an alternative embodiment, each interface unit 224 may be coupled to up to 24 trunk lines.

Interface unit 224 includes one or more signal transfer devices which each operate under control of control unit 201 to transfer information between the VRU and trunk lines coupled to the interface unit 224. Interface unit 224 is preferably of a type available from Dialogic Corporation, Parsippany, N.J. 07054.

As noted above, each VRU contains a system control unit, seen at 201, which operates to control and configure the functions performed by the VRU. Such control units preferably utilize a Central Processing Unit (CPU) 202 in the form of a microprocessor of the type available from Intel Corporation, Santa Clara, Calif. 95051 and described in *Microprocessor and Peripheral Handbook*, 1988 available from the Intel Corporation. CPU 202 transfers data and instructions to and from an Industry Standard Association (ISA) type bus 210. Read-Only Memory (ROM) 203 stores information required to boot the system upon power-up, and Random Access Memory (RAM) 208 stores program information downloaded at system boot time and serves as a temporary storage area for instructions and data to be used by CPU 202. Other circuitry within control unit 201 includes: a Small Computer System Interface (SCSI) type disk controller 207 which transfers information to and from a storage unit 230 of known type which preferably includes a plurality of disk drives 231,232, 233 and 234; a display controller 205 of known type which controls the display of information on a visual display; an ethernet controller 204 of known type which controls the transfer of information to an ethernet type network; and a serial I/O unit 206 of known type which preferably transfers information serially in accordance with the aforementioned RS-232 standard to and from control unit 201 to a data entry terminal and a modem.

Each VRU 103–106 preferably includes one or more specialized modules of the types seen at 220, 221 and 222 which receive, transmit and process specific types of information. Voice processing module 220 is coupled to bus 210 and operates under control of control unit 201 to provide VRU 103 with the capability to store and retrieve voice messages over the PSTN 107. Each voice processing module 220 comprises a plurality of voice processing channels which receive voice information routed from a corresponding channel in interface unit 224. Each channel in the interface unit corresponds to a channel in a trunk group, with each trunk group having four channels. As used in the present specification, the term channel corresponds to a single telephone line within a trunk group. Consequently, in a preferred embodiment a trunk group consists of four trunk lines. Fax processing module 221 is coupled to bus 210 and operates under control of control unit 201 to receive and transmit documents according to known facsimile data transmission formats. Voice recognition module 222 is coupled to bus 210 and operates under control of control unit 201 to convert certain speech utterances into a format understandable by the VRU.

Voice processing module 220, fax processing module 221 and voice recognition module 222 are additionally coupled to a bus 223 known as a PCM Expansion Bus (PEB) to enable the transfer of information to and from interface unit 224. A PEB as shown at 223 is preferably of the type available from Dialogic Corporation, Parsippany, N.J. 07054.

In a preferred embodiment of the present invention, control unit 201 advantageously enables interface unit 224 to communicate with a plurality of different types of trunk lines by allowing an administrator of the VRU in which the control unit is located, to enter configuration commands to generate state definitions and parametric definitions or to assign preconfigured stored files to be used. Control unit 201 interprets the entered commands and provides interface unit 224 with state definitions and certain parametric values which enable interface unit 224 to communicate information with a corresponding trunk group which transmits information in a manner corresponding to the configuration commands entered by the administrator for the particular trunk group.

A preferred embodiment of the present invention advantageously utilizes configuration files, which preferably contain definitions for a trunk group and which may be created, stored and modified via the VRU to define the behavior of a trunk group. When the VRU is configured, each channel in the system is assigned a trunk type. During normal operation the definition of the trunk type specified for a channel, as defined in a configuration file, will determine the behavior of that channel.

A configuration file is composed of one or more trunk type definitions plus comments. Configuration files preferably take the format of text files, and may be created and modified by application programs of known type such as text editors and word processors which can read, manipulate and write text-type files. A trunk type definition is composed of parameter settings and a state machine definition.

A preferred template for a trunk type definition is shown below. In the below definition, text which is preceded by a "#" character is understood to be comments which are ignored by trunk behavior interpreter within the VRU:

```

#       Description of this trunk type

define  Trunk-Type-Name
        #       Inherit from a more general trunk type
        inherit General-Trunk-Type-Name;
        #       Set parameters specific to this trunk type
        set     param1 = value1;
                * * *
        set     paramN = valueN;
        #       Define the start state and state machine for this type
        start   InitialState;
        state   InitialState    [ABH] {   event ( action_list; ) NextState;
                                          * * *
                                          event ( action_list; ) NextState;
}
                                * * *
```

```
       state    LastState    [ABH] {   event ( action_list; ) NextState;
                                              * * *
                                       event ( action_list; ) NextState;
}
end
```

The above example of a preferred embodiment of a trunk type definition within a configuration file contains a plurality of sections which each perform a separate function in defining the operating characteristics of a particular trunk group. The following description elaborates on the features and functions of each of the sections.

DEFINITION OF A TRUNK TYPE NAME (define Trunk-Type-Name)

Each trunk type definition is identified by a unique name entered by the administrator. The trunk type definition is contained in a file which is created via a text editor as an ASCII format file and which can contain the definitions of one or more trunk type. Each individual trunk type is assigned a descriptive name by the creator of the definition. The trunk type is subsequently referenced by the name. Each trunk group in the system may have a unique trunk behavior definition. If multiple trunks use the same definition then only one interpreted definition is used by the system.

INHERITANCE OF PARAMETER VALUES (inherit General-Trunk-Type-Name;)

A preferred embodiment of the present invention advantageously allows inheritance of trunk definitions which have already been defined. This avoids either the re-entry of parameters already entered for another trunk definition or the copying of already entered parameters. Definitions which have already been defined may be inherited by another definition by referencing the already defined definition with use of the "inherit" command. Changes to specific parameters of the inherited definition may then be made by the setting of specific values with the "set" command as described below. The advantageous feature of inheritance allows child definitions to be created which inherit values set in a parent definition. Subsequent modifications of the parent definition are then reflected in the child definitions for the values which have not been specifically set as described below.

SETTING OF SPECIFIC VALUES (set param1=value1;)

Values for individual parameters may be assigned using the "set" command. In a preferred embodiment, all parameters are system defined, (i.e. administrators may not create new or modified parameters) and are assigned a default value. If the value of a parameter is not explicitly set, the default value will be used. In the below listing of system parameters, the system parameter name is followed by the default value and the units of the values. Default values for all defined parameters are preferably stored in a separate default file. A description of the system parameter is provided following the system parameter name, default value and units. The below system parameters are grouped according to the general function defined by the parameter.

Trunk General Parameters type        0x0000        [#]
   Specifies the numeric trunk type. The upper two hex digits
   (Major Type) are the type code returned in a trunk type
   report and the lower two hex digits (Minor Type) are
   provided to allow uniqueness between different trunk types
   of the same general class.

Major Type:  00    LoopStart
                20    Unused
                40    Unused
                60    DID
                80    E&M
usedti        0        [0,1]
   Specifies whether this trunk type uses AB Signalling bits
   directly for hook state transitions or whether the
   RING/LC events are used (0=RING/LC events, 1=
   AB bits). This is not the same as whether the trunk type is
   a T-1 interface. A trunk type can use a T-1 interface and
   still use the RING/LC event scheme (the reverse however
   is not true).
allowmf       0        [0,1]
Specifies whether to allow MF (multi-frequency) capabilities.
allowdp       0        [0,1]
Specifies whether to allow Dial Pulse capabilities. Dial pulse
capabilities are preferably only supported using a DID network
interface card.
usetones      0        [0,1]
Specifies whether to allow tone detection. This parameter must be
set to 0 for trunk types designed for use with 4-port cards.
boardtype     0        [0,1]
Specifies whether characteristics of an A series or B series board
are to be used D/121A boardtype = 0 (default). D/121B
boardtype = 1).
setmode       0        [0,1]
Specifies whether digit mode control should be handled by the
VTK (if internal DNIS & ANI collection is being used) or by
Generations.
playgain      0        [db]
Specifies the gain adjustment to use when playing prompts and
tones. This parameter is rounded down to a 3 dB increment. Valid
values must be in the range of –30 dB to +9 dB. This parameter
has no effect on 4-port cards.
delaylen      2        [see}
Specifies the number of seconds to delay when arbitrary delays
are required during the processing of a trunk type (this parameter
is used by the doDELAY action).
ttsqueue      0        [#]
Specifies the number of seconds to queue a channel while waiting
for a text to speech resource.
usespeed      0        [#]
Specifies whether speed control will be allowed (may only be
used with "B" boards 0 = not used; 1 = used.
boardtype     0        [0,1]]
Specifies which Spring card is being used 0 = D/121A,
1= D/121B
callperf      0        [#]
Specifies whether or not c and d signalling bits will be used
(E1 applications)
usecdbits     0        [#]
Specifies which Spring card is being used 0 = D/121A,
1= D/121B
recsil        0        [see]
Specifies detection threshold for certain amount of silence in
seconds (0 = disabled) When threshold is reached the eRECSIL
event will be generated that may be used for some actions
ns42          0        [#]
Specifies whether this is D/42NS board (for Norstart
Applications).
hasadsi       0        [#]
Specifies whether ADSI will be used.
useagc        1
Specifies whether AGC (Automatic Gain Control) is enabled (1)
or disabled (0).

Hookstate Control Parameters pulselen      25       [10ms]
Duration for a generated metering pulse.

-continued flashlen                50        [10ms]
Duration for a generated flash hook in a dial command (dial "&")
or doFLASH action.
flashlen2               50        [10ms]
Duration for a generated flash hook from the 7F command.
minoffhk                50        [10ms]
Minimum guard interval between going offhook and going back
onhook.
winklen                 40        [10ms]
Duration for a generated wink.
winkdly                 5         [10ms]
Minimum delay required after ring detection before a wink can
be generated.
offhdly                 5         [10ms]
Delay after changing hookstate before reporting completion. Only
applies if usedti=0.
flashmsk                0xF       [#]
mask to be XORed with the current value od the ABCD bits
during a hookflash (A is the least significant bit) This is used in
FXS-T1 trunk types.
winkmsk                 0xF       [#]
mask to be XORed with the current value od the ABCD bits
during a wink (A is the least significant bit).
pulsemsk                0xF       [#]
mask to be XORed with the current value od the ABCD bits
during a metering pulse (A is the least significant bit).

Hookstate Detection Parameters minlcoff                35        [10ms]
Minimum duration for a valid Loop Current Off event. Only
applies if usedti=0.
r_edge                  1         [1 or 2]
Edge of ring cycle to report detection on (1=Leading Edge,
2=Trailing Edge). Only applies if usedti=0.
r_ird                   80        [100ms]
Maximum length of a ring cycle. Only applies if usedti = 0.
r_off                   5         [see]
Maximum length of the Ring-Off period in a ring cycle. Only
applies if usedti=0.
r_on                    3         [see]
Maximum length of the Ring-On period in a ring cycle. Only
applies if usedti=0.
ringcnt                 1         [#]
Number of ring cycles to wait before reporting ringing event.
Only applies if usedti=0.

Indialing General Parameters calltype                0         [0,1]
Specifies the type of digits to expect during normal call
processing (0=DMTF, 1=MF).
dnistype                0         [0,1]
Specifies the type of digits to expect when collecting DNIS
information (0=DMTF, 1=MF).
dnisnum                 0         [0..15]
Specifies the number of digits to expect when collecting DNIS
information.
anitype                 0         [0,1]
Specifies the type of digits to expect when collecting ANI
information (0=DMTF, 1=MF).
aninum                  0         [0..15]
Specifies the number of digits to expect when collecting ANI
information.
pdtmo                   1         [see]
Specifies the pre-dial timeout for collecting DNIS or ANI digits.
idtmo                   1         [see]
Specifies the inter-digit timeout for collecting DNIS or ANI
digits.

Indialing DTMF Parameters dtmfdlk                 1         [10ms]
Additional minimum debounce time (in excess of 40ms) of
DTMF digit during playing.
dtmfdeb                 0         [10ms]
Additional minimum debounce time (in excess of 40ms) of
DTMF digit during recording.
dflags                  0         [0 or 1]
Edge of digit to report detection on (0=Leading Edge,
1=Trailing Edge).

-continued

Indialing MF Parameters mfminon                 0         [10ms]
Minimum duration (in excess of 40ms) of an MF digit.
kptype                  2         [0,2]
Minimum duration for a KP digit (0=40ms, 2=65ms).
Indialing Dial Pulse Parameters minbreak                2         [10ms]
Minimum duration of a break pulse.
minmake                 2         [10ms]
Minimum duration of a make pulse.
maxbreak                35        [10ms]
Maximum duration of a break pulse. This parameter should be less
than or equal to minlcoff.
maxmake                 25        [10ms]
Maximum duration of a make pulse before it is considered an
interdigit make interval.
Outdialing General Parameters dialtype                0         [0,1]
Specifies the type of digits to use when outdialing (0=DTMF,
1=MF).
dialdly                 25        [10ms]
Duration of the pre-dial delay after detecting network. Also the
duration of the delay caused by each comma in the dial string.
netchk                  6         [see]
Maximum amount of time to wait for network prior to dialing.
Outdialing DTMF Parameters ttdata                  9         [10ms]
Specifies the duration of dialed DTMF digits.
tt_idd                  11        [10ms]
Specifies the duration of the inter-digit pause when dialing DTMF
digits.
Outdialing MF Parameters mftone                  9         [10ms]
Duration of dialed MF digits.
mfdelay                 11        [10ms]
Duration of the inter-digit pause when dialing MF digits.
kplength                10        [10ms]
Duration of a generated KP digit.
Outdialing Dial Pulse Parameters breaklen                4         [10ms]
Duration of a dialed break pulse.
makelen                 6         [10ms]
Duration of a dialed make pulse.
dpidd                   25        [10ms]
Duration of an interdigit make interval.
Outdialing Call Analysis Parameters - Ring & Busy Detection stdely                  25        [10ms]
Delay to wait after dialing digits before beginning call analysis.
cnosig                  1775      [10ms]
Maximum amount of time to wait for any energy before returning
pre-ring timeout.
logltc                  10        [10ms]
Maximum low period to deglitch (ignore).
higltch                 20        [10ms]
Maximum high period to deglitch (ignore).
cnosil                  250       [10ms]
Maximum duration of any period of energy before it is considered
an answer. This value should always be larger than the maximum
expected high period for a ring or busy cycle or these tones will
not detect properly.
slowrmax                90        [10ms]
Maximum short low period for rings.
llowrmin                225       [10ms]
Minimum long low period for rings.
llowrmax                700       [10ms]
Maximum long low period for rings.
slowbmax                90        [10ms]
Maximum short low period for busy.
llowbmax                90        [10ms]
Maximum long low period for busy.
hibmax                  90        [10ms]
Maximum high period for busy.
nbrbeg                  1         [#]
Number of the ring cycle to begin cadence analysis on
(for stuttering rings).

-continued

| | | |
|---|---|---|
| slowrtol | 30 | [%] |

Tolerance for short low periods for rings.

| | | |
|---|---|---|
| llowrtol | 30 | [%] |

Tolerance for long low periods for rings.

| | | |
|---|---|---|
| hirtol | 30 | [10ms] |

Tolerance for first high periods for rings.

Outdialing Call Analysis Parameters - Positive Voice Detection

| | | |
|---|---|---|
| lcdly | 6000 | [10ms] |

Delay after dialing before beginning checking for loop current transient drops as a valid answer.

| | | |
|---|---|---|
| maxansr | 25 | [10ms] |

Minimum duration of energy required for a valid answer.

| | | |
|---|---|---|
| ansrdgl | 600 | [10ms] |

Maximum amount of time to wait for energy after ringing has stopped before returning post-ring timeout. A value of −1 in this field disables answer detection (an ANSWER is returned immediately after it has been determined that ringing has stopped).

| | | |
|---|---|---|
| pamdspd | 1 | [#] |

0=quick; 1= full PAMD analysis.

| | | |
|---|---|---|
| pamdqual | 11 | [#] |

Which qualification template to use.

| | | |
|---|---|---|
| pamdfail | 400 | [10ms] |

Length of time after first ringback before returning no answer.

| | | |
|---|---|---|
| pamdrin | 190 | [10ms] |

Maximum interring delay

| | |
|---|---|
| busyrpt | 2 |

Specifies number of ring cycles required for proper detection of the network busy signal Tone Detection Parameters

| | | |
|---|---|---|
| dialf1 | 350 | [Hz] |

First tone frequency for dial tone.

| | | |
|---|---|---|
| dialf2 | 440 | [Hz] |

Second tone frequency for dial tone. If dial tone is a single frequency tone specify zero in this field.

| | | |
|---|---|---|
| dialftol | 5 | [%] |

Tolerances for frequency elements.

| | | |
|---|---|---|
| dialmin | 200 | [10ms] |

Minimum time dial tone must be present to be considered valid.

| | | |
|---|---|---|
| sdialf1 | 0 | [Hz] |

First tone frequency for second dial tone.

| | | |
|---|---|---|
| sdialf2 | 0 | [Hz] |

Second tone frequency for second dial tone. If dial tone is a single frequency tone specify zero in this field.

| | | |
|---|---|---|
| sdialftol | 0 | [%] |

Tolerances for frequency elements.

| | | |
|---|---|---|
| sdialmin | 0 | [10ms] |

Minimum time second dial tone must be present to be considered valid.

| | | |
|---|---|---|
| busyf1 | 480 | [Hz] |

First tone frequency for busy tone.

| | | |
|---|---|---|
| busyf2 | 620 | [Hz] |

Second tone frequency for busy tone. If busy tone is a single frequency tone specify zero in this field.

| | | |
|---|---|---|
| busyftol | 5 | [%] |

Tolerances for frequency elements

| | | |
|---|---|---|
| busyon | 50 | [10ms] |

Expected on cadence for busy tone.

| | | |
|---|---|---|
| busyoff | 50 | [10ms] |

Expected off cadence for busy tone.

| | | |
|---|---|---|
| busyctol | 10 | [%] |

Tolerance for cadence components.

ACD Logon/Logoff Parameters

| | | |
|---|---|---|
| acdspre | 0x1 | [Dig] |

ACD SPRE code to use when dialing as represented in hex encoded DTMF.

| | | |
|---|---|---|
| acdcon | 0x97 | [Dig] |

ACD Logon function code to use when dialing as represented in hex encoded DTMF.

| | | |
|---|---|---|
| acdcoff | 0x97 | [Dig] |

ACD Logoff function code to use when dialing as represented in hex encoded DTMF.

| | | |
|---|---|---|
| acdgrou | 1000 | [Dig] |

ACD Agent group base to use when dialing as represented in BCD encoded DTMF.

ADSI Parameters

| | | |
|---|---|---|
| adsif1 | 213 | [Hz] |

ADSI frequency 1

| | | |
|---|---|---|
| adsif2 | 2750 | [Hz] |

ADSI frequency 2

| | | |
|---|---|---|
| adsia1 | −15 | [2B] |

ADSI freq 1 amplitude

| | | |
|---|---|---|
| adsia2 | −15 | [2B] |

ADSI freq 2 amplitude

| | | |
|---|---|---|
| adsion | | [10ms] |

Length of the ADSI tone in 10msec units

STATE MACHINE DEFINITION

A preferred embodiment of the present invention advantageously utilizes a trunk behavior language which allows an administrator to define the specific implementation of the standard call flow for a given hardware interface and protocol of a trunk group. The standard call flow is a generic representation of the significant control states present on a telephony trunk. Such control states include the following:

Make Busy

An asserted state signaling that the trunk is unready for incoming calls.

Reverse Make Busy

A detected state signaling that the remote end is unready for incoming calls.

Idle State

An asserted/detected state indicating that the trunk is ready to process incoming calls.

Make Call

An asserted state for handling a trunk initiated call including all necessary addressing and control information. The call attempt can either result in a successful call (transitioning to the call state) or a failed call (returning to idle).

Detect Call

A detected state indicating an incoming call including all relevant addressing and control information. This call may either be accepted (transitioning to the call state) or rejected (returning to the idle state).

Call State

The state in which a call has been placed and accepted and a connection exists.

Detect Disconnect

The detected state in which the remote end party has disconnected.

Disconnect

The asserted state in which the trunk has disconnected.

A specific protocol can advantageously detect and effect changes between the above states using any of the following mechanisms:

On digital trunks—the transition of signaling bits;

On analog trunks—the line hook state (e.g. loop current or battery polarity);

The detection and generation of digit signals (e.g. DTMF, MF, R2MF, pulse);

The detection and generation of call progress signals (e.g. Dial Tone, Busy Tone); and Timed transitions of any of the above conditions.

In addition to controlling protocols, the trunk behavior language can advantageously control the state of system indicators such as trunk state lights on the VRU, and parameters which control interface related properties of standard call flow operations such as gain on playback and digit type for call-state digit detection.

Listed below is a sample trunk type file which defines a T-1 type line emulating an E&M Wink Start protocol. As can be seen from the below example, of a trunk type file, the trunk behavior language allows the definition of an initial state and subsequent states which occur to establish a telephone connection between a calling and a called party, to transfer into from the calling and called party, and to terminate the connection. Each state contains an event or events which are required for the state be executed, an action or actions to be taken by the state in responding to the received event or events, and a subsequent state to be taken in response to each of the possible events. The following definition is reproduced from the Example Trunk Type File listed below and helps in understanding the portions of a state definition.

```
state sCLR1 [000] {    [0*]      (rspIDLE;)    sIDLE;
                       cANSW     (rspCALL;)    sCALL;
                       cBUSY     ()            sBUSY;     }
```

For the state "sCLR1" three events, also termed commands may trigger the state: a string of bits preceeded by a "0" bit, a "cANSW" command, or a "cBUSY" command. Occurrence of one of the three commands will result in a corresponding action being taken. The action represented by "rspIDLE" will be taken in response to a string of bits preceeded by a "0" bit, the action represented by "rspCALL" will be taken in response to a "cANSW" command, and no action will be taken in response to a "cBUSY" command. Finally, one of three subsequent states will be entered in response to one of the three events: state "sIDLE" will be entered in response to a string of bits preceeded by a "0" bit, state "sCALL" will be entered in response to a "cANSW" command and state "sBUSY" will be entered in response to a "cBUSY" command.

An Example Trunk Type File

```
#Trunk Type Definition for a T-1 Line emulating an E&M Wink Start Protocol
#AB bit definitions for the A-Side E&M Emulation mode are:
#   Tx:   AB=11    M-Lead Battery       Rx:    AB=1*    E-Lead Looped
#         AB=11    M-Lead Ground               AB=0*    E-Lead Open
#   AB bit definitions for the B-Side E&M Emulation mode are:
#   Tx:   AB=11    E-Lead Looped        Rx:    AB=1*    M-Lead Battery
#         AB=11    E-Lead Open                 AB=0*    M-Lead Ground

#   All parameters not specified below use the values defined in dcm.defl
#   which contains the appropriate values for the country configuration
#   loaded.

define T1-E&M-Wink
    # Define the required parameters for any trunk type
    set type = 0x9000;      # Type code is 90 (digital E&M) subcode is 00
    set usedti = 1;         # This trunk type monitors AB bits directly
    set usetones = 1;       # Allow tone detection for better call progress
    # Define some outdialing parameters
    set dialtype = 0;       # use DTMF digits when outdialing
    # Define the start state - Whenever the trunk is reset it returns to the
    # start state
    start sBUSY;
    # In the busy state the trunk is OFFHOOK - To exit this state the trunk
    # must be unbusied by the host
    state sBUSY [111] {    cUNBUSY       ()            sCLR1;     }
    # In the busy state the trunk is ONHOOK - this state is used to debounce
    # the network response to the trunk having been busied out. This state
    # is exited when the line returns to an idle state. This state prevents
    # false caller detection due to the line state of the network caused by
    # having been presented a busied line.
    state sCLR1 [000] {    [0*]          (rspIDLE;)    sIDLE;
                           cANSW         (rspCALL;)    sCALL;
                           cBUSY         ()            sBUSY;     }
    # In the idle state the trunk is ONHOOK and waiting for a new call -
    # This state is exited by receiving an A-bit high transition (new
    # incoming call or by the trunk being busied out or by an outgoing
    # call being made - If an incoming call is detected a response is sent
    # to the host
    state sIDLE [000] {    [1*]          (rspNEW;)     sIN1;
                           cBUSY         (rspBUSY;)    sBUSY;
                           cANSW         (rspCALL;)    sWAIT;
                           cMAKE         ()            sNET1;     }
    # In the in1 state the trunk is ONHOOK and waiting for the host to answer
    # the caller present - This state is exited by the host answering or
    # rejecting the call or by receiving an A-bit low transition (the caller
    # going away) - If the caller goes away a response is sent to the host
    state sIN1 [000] {     cANSW         (rspCALL;)    sCALL;
                           [0*]          (rspEND;)     sEND3;
                           cHANG         ()            sEND2;
                           cBUSY         (rspBUSY;)    sBUSY;     }
    # In the wait state the trunk is OFFHOOK - This state is exited by the
    # an A-bit high transition (the caller being present) - this state
    # prevents the hangup message from being generated if a trunk is seized
    # and a caller is not already present.
```

-continued

An Example Trunk Type File

```
state sWAIT [111] {    [1*]       ()              sCALL;
                       cHANG      ()              sIDLE;)
                       cBUSY      (rspBUSY;)      sBUSY;
                       cDIAL      (doDIAL_CP;)    sOUT2;      }
# In the call state the trunk is OFFHOOK - This state is exited by the
# host hanging up the call or by receiving an A-bit low transition (the
# caller going away) - If the caller goes away a response is sent to
# the host
state sCALL [111] {    [0*]       (rspEND;)       sEND1;
                       cHANG      ()              sEND2;
                       cBUSY      (rspBUSY;)      sBUSY;
                       cDIAL      (doDIAL_CP;)    sOUT2;
                       cADDON     (doFLASH;)      sADD1;      }
In the end1 state the trunk is OFFHOOK - This state is entered when the
# call is still in progress but the caller has hungup - To exit this
# state the host must hangup the trunk as well
state sEND1 [111] {    cHANG      ()              sEND2;
                       cBUSY      (rspBUSY;)      sBUSY;      }
# In the end2 state the trunk is ONHOOK - This state is entered when the
# call has been ended but the caller has not yet hungup - To exit this
# state the caller must hangup the trunk as well
state sEND2 [000] {    [0*]       (rspIDLE;)      sIDLE;
                       cBUSY      (rspBUSY;)      sBUSY;)     }
# In the end3 state the trunk is ONHOOK - This state is entered when the
# call has not yet been started but the caller has hungup - To exit this
# state the host must hangup the trunk as well
state sEND3 [000] {    cHANG      ()              sEND2;
                       cBUSY      (rspBUSY;)      sBUSY;      }
# In the add1 state the trunk is OFFHOOK - This state is entered when the
# trunk has requested an addon call and is waiting for the network to
# acknowledge readiness - This state is exited if the network is ready
# or if the network check timer expires - The network can signal it is
# ready by winking the A-bit
state sADD [111] {     eWINK      (doDIAL_CP;)    sOUT1;
                       fNETTMR    ()              sEND2;      }
# In the net1 state the trunk is OFFHOOK - This state is entered when the
# trunk has requested an outgoing call and is waiting for the network to
# acknowledge readiness - This state is exited if the network is ready
# or if the network check timer expires - The network can signal it is
# ready by winking the A-bit
state sNET1 [111] {    eWINK      (doDIAL_CP;)    sOUT1;
                       fNETTMR    ()              sEND2;      }
# In the out1 state the trunk is OFFHOOK - This state is entered when the
# trunk is placing an outgoing call and is waiting for call progress
# results - This state is exited when the call progress results return
state sOUT1 [111] {    fCP_OK     (rspCALL;)      sWAIT;
                       tBUSY      (doCP_STOP;)    sOUT1;
                       fCP_BAD    ()              sEND2;      }
# In the out2 state the trunk is OFFHOOK - This state is entered when the
# trunk is placing an outgoing call and is waiting for call progress
# results - This state is exited when the call progress results return
state sOUT2 [111] {    fCP_OK     (rspCALL;)      sWAIT;
                       tBUSY      (doCP_STOP;)    sOUT2;
                       fCP_BAD    ()              sWAIT;      }
end
```

Figure 3A:
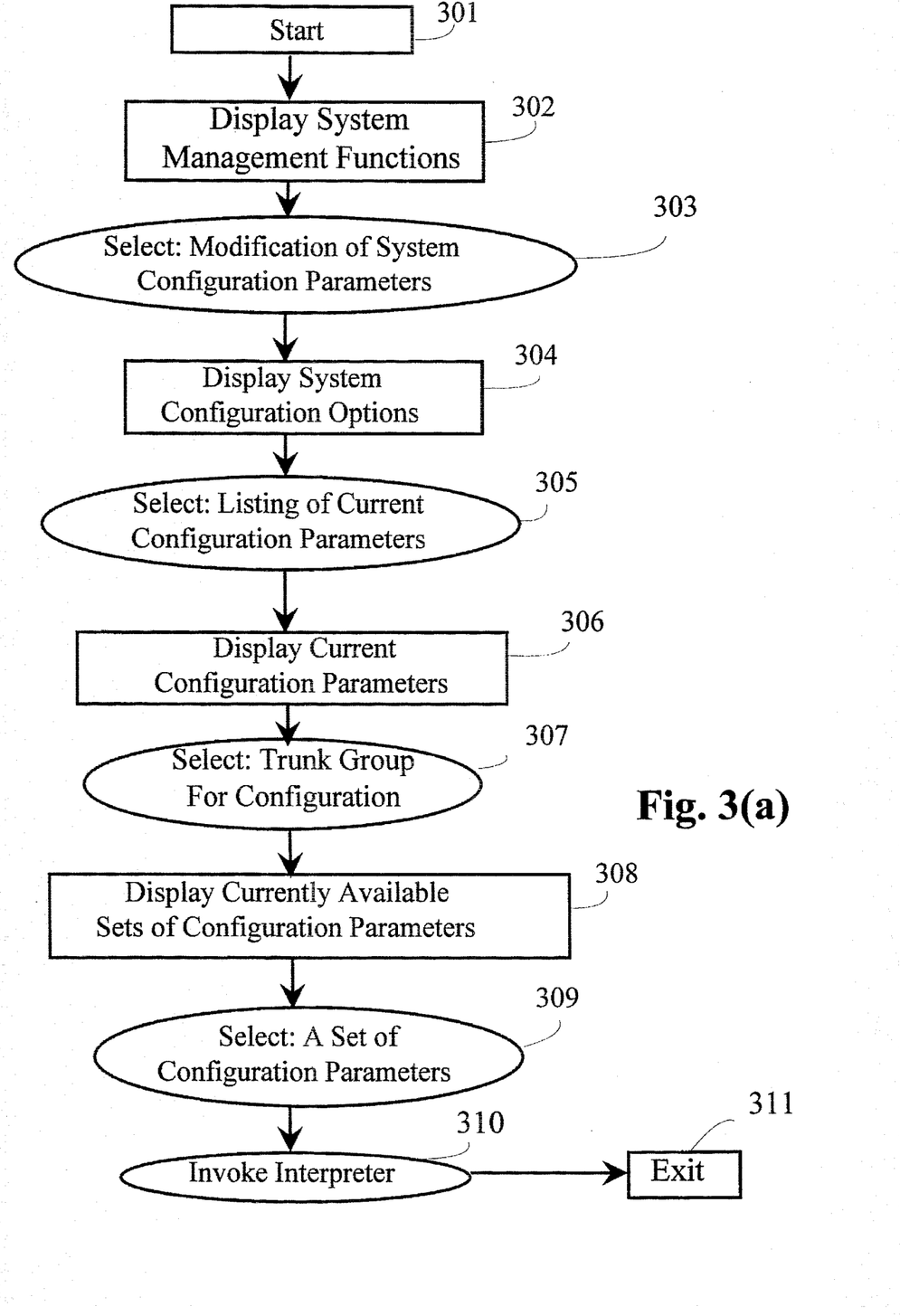
FIGS. 3(a) and 3(b) are flowcharts of a preferred embodiment of the invention.
Figure 3B:
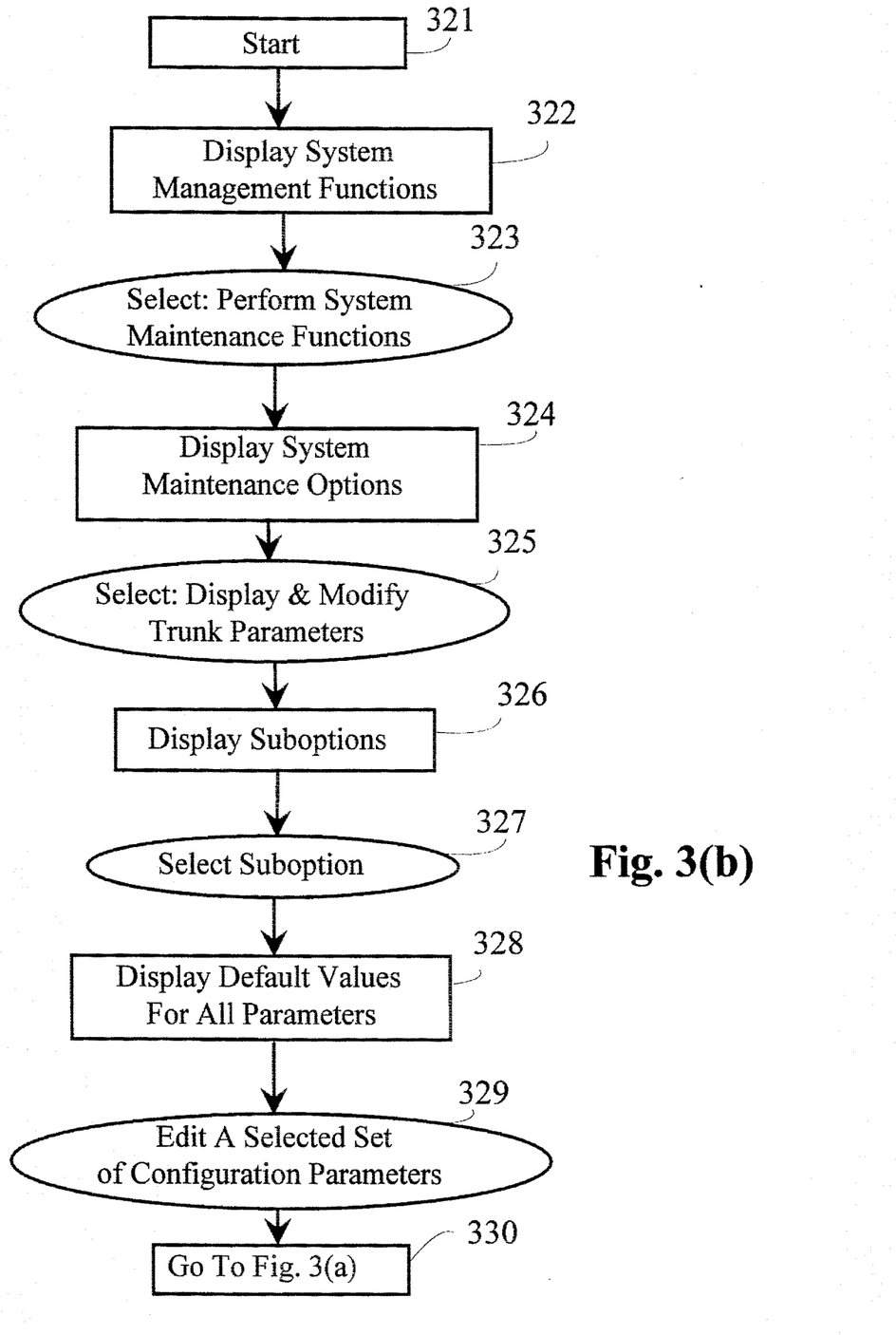

FIGS. 3(a) and 3(b) show the steps taken in a preferred embodiment to change the configuration of a selected trunk group. In FIGS. 3(a) and 3(b), rectangular shaped steps signify steps taken by the VRU, and oval shaped steps signify commands entered by a system administrator using the VRU. Such commands entered by the administrator are preferably performed at a data processor of type 100 which is coupled to the VRU 104 by a local area network 110. In an alternate embodiment, the commands are performed at a data entry terminal 102 coupled to the VRU 101 via a serial type communications link 112. In yet another embodiment, such commands are performed at a remotely located data processor 108 coupled to a VRU 105 via modem 120 and 137, and telephone lines 118, 139, 117 and 137. The procedure is entered at 301 upon logging on by a system administrator to an operating system running on the VRU. As will be known to those skilled in the art in view of the present disclosure, such an operating system manages resources and functions of the VRU. In a preferred embodiment, such an operating system takes the form of the UNIX® System Five type operating system available from The Santa Cruz Operation, Inc., Santa Cruz, Calif. 95061. Upon logging onto the operating system, the system administrator is presented at 302 with a plurality of system management options which are shown below:

config—Display & modify system configuration parameters.

log—Display the system event log.

files—Perform file management functions.

status—Perform system status functions.

reset—Perform a full VRU reset.

install—Perform software installation functions.

diag—Perform system diagnostics functions.

admin—Perform account administration functions.

maint—Perform system maintenance functions.

quit—Log out of the service console.

At 303, an administrator wishing to display and modify system configuration parameters enters the "config" command or a variation thereof, and is presented at 304 with a list of options for displaying and modifying system configuration parameters which are shown below:

list—List the current configuration parameters.
sys—Modify system parameters.
path—Modify path parameters.
t1span—Modify T-1 span parameters.
e1span—Modify E-1 span parameters.
trunk—Modify trunk group parameters.
tts—Modify tts port parameters.
fax—Modify fax port parameters.
vrec—Modify voice recognizer parameters.
done—Save changes and return to previous menu.
cancel—Return to the previous menu without saving changes.

At 305, the administrator may list current configuration parameters of the system by use of the "list" command. At 306 current configuration parameters of the system are displayed as seen below:

---

SYSTEM INFORMATION

Sysgen File Version = 1.08
Sample Rate = 32k
Host Communications Link = auto
Com Port Used = /dev/tty2a
Baud Rate Used [bps] = 9600
Default Tail Erase [msec] = 250
Maximum Record Length [Minutes] = 15
Minimum Valid Voice [msec] = 250
Host Link Failure Mode = none
Modem Baud Rate Used [bps] = 2400
VOLUME INFORMATION

| VOLUME 1 | Total Capacity = 99.5 MB |
|---|---|
| VOLUME 2 | Total Capacity = 99.5 MB |
| VOLUME 3 | Total Capacity = 99.5 MB |
| VOLUME 4 | Total Capacity = 99.5 MB |

TRUNK INFORMATION

| TRUNK GROUP 01 | Channels 00–03 | PEB 0 | T1-E&M |
|---|---|---|---|
| TRUNK GROUP 02 | Channels 04–07 | PEB 0 | T1-E&M |
| TRUNK GROUP 03 | Channels 08–11 | PEB 0 | T1-E&M |
| TRUNK GROUP 04 | Channels 12–15 | PEB 0 | T1-E&M |
| TRUNK GROUP 05 | Channels 16–19 | PEB 0 | T1-E&M |
| TRUNK GROUP 06 | Channels 20–23 | PEB 0 | T1-E&M |
| TRUNK GROUP 07 | Channels 24–27 | PEB 1 | T1-E&M |
| TRUNK GROUP 08 | Channels 28–31 | PEB 1 | T1-E&M |
| TRUNK GROUP 09 | Channels 32–35 | PEB 1 | T1-E&M |
| TRUNK GROUP 10 | Channels 36–39 | PEB 1 | T1-E&M |
| TRUNK GROUP 11 | Channels 40–43 | PEB 1 | T1-E&M |
| TRUNK GROUP 12 | Channels 44–47 | PEB 1 | T1-E&M |

T-1 SPAN INFORMATION

| T-1 SPAN 1 | Sync slave | Protocol bit7 | Cable Length 133 |
|---|---|---|---|
| T-1 SPAN 2 | Sync slave | Protocol bit7 | Cable Length 133 |

---

As can be seen from the above listing, configuration parameters relating to many different aspects of the system are listed. Information regarding configuration parameters of trunk lines coupled to the VRU are listed above under the heading entitled "TRUNK INFORMATION." In the listing above, 48 telephone lines, termed channels above, are coupled to the VRU in trunk groups with each trunk group having four channels. As can be seen from above, TRUNK GROUP 01 includes four channels, numbered 00 to 03. Also listed is the PEB corresponding to each trunk group. As can be seen from the above listing, the VRU contains two PEBs with PEB 0 corresponding to trunk groups 01–06, and PEB 1 corresponding to trunk groups 7–12. As explained in the description accompanying FIG. 2, a PEB couples the interface unit 224 to 6 being coupled to specialized modules of the types seen at 220, 221 and 222. Accordingly in a VRU corresponding to the above listing, information flowing through trunk groups 01–06 is processed by specialized modules coupled to PEB 0 and information flowing through trunk groups 7–12 is processed by specialized modules coupled to PEB 1. As can be further seen from the above listing, trunk groups 01–12 are all T1 type of lines communicating according to an E&M protocol.

At 307, the administrator selects a trunk group for configuration. In order to change the configuration of a particular trunk group, the administrator enters an "edit" command along with an identification of a trunk group sought to be configured:

---

/sci/config> tr 1 edit
Current Trunk Type = 8

| 0 | DID |
|---|---|
| 1 | DID-Pulse |
| 2 | E1R2-16D |
| 3 | LCO-LoopStart |
| 4 | Loop-B |
| 5 | LoopStart |
| 6 | Example-1 |
| 7 | E1-R2MF-CCITT |
| 8 | T1-E&M |
| 9 | T1-E&M-Wink |

Trunk Type = 9

---

At 308, as can be seen from above, a preferred embodiment responds to the administrator "edit" command by listing ten predefined sets of configuration parameters which each comprise a plurality of values for each of the configuration parameters. As seen at 309, the administrator may then select one of the ten predefined sets of configuration parameters for selected trunk group 01. As seen above, predefined set number 9 is chosen for trunk group 01.

Upon listing of system information, the trunk type for trunk group 01 can be seen below to have changed from its initial value of 8 which corresponds to a T1-E&M type of line to the selected value of 9 which corresponds to a T1-E&M-Wink type of line:

--- sci/config> list

SYSTEM INFORMATION

Sysgen File Version = 1.08
Sample Rate = 32k
Host Communications Link = auto
Com Port Used = /dev/tty2a
Baud Rate Used [bps] = 9600
Default Tail Erase [msec] = 250
Maximum Record Length [Minutes] = 15
Minimum Valid Voice [msec] = 250
Host Link Failure Mode = none
Modem Baud Rate Used [bps] = 2400
VOLUME INFORMATION

| VOLUME 1 | Total Capacity = 99.5 MB |
|---|---|
| VOLUME 2 | Total Capacity = 99.5 MB |
| VOLUME 3 | Total Capacity = 99.5 MB |
| VOLUME 4 | Total Capacity = 99.5 MB |

TRUNK INFORMATION

| TRUNK GROUP 01 | Channels 00–03 | PEB 0 | T1-E&M-Wink |
|---|---|---|---|
| TRUNK GROUP 02 | Channels 04–07 | PEB 0 | T1-E&M |
| TRUNK GROUP 03 | Channels 08–11 | PEB 0 | T1-E&M |
| TRUNK GROUP 04 | Channels 12–15 | PEB 0 | T1-E&M |
| TRUNK GROUP 05 | Channels 16–19 | PEB 0 | T1-E&M |
| TRUNK GROUP 06 | Channels 20–23 | PEB 0 | T1-E&M |
| TRUNK GROUP 07 | Channels 24–27 | PEB 1 | T1-E&M |
| TRUNK GROUP 08 | Channels 28–31 | PEB 1 | T1-E&M |
| TRUNK GROUP 09 | Channels 32–35 | PEB 1 | T1-E&M |

-continued

| sci/config> list | | | |
|---|---|---|---|
| TRUNK GROUP 10 | Channels 36–39 | PEB 1 | T1-E&M |
| TRUNK GROUP 11 | Channels 40–43 | PEB 1 | T1-E&M |
| TRUNK GROUP 12 | Channels 44–47 | PEB 1 | T1-E&M |
| T-1 SPAN INFORMATION | | | |
| T-1 SPAN 1 | Sync slave | Protocol bit7 | Cable Length 133 |
| T-1 SPAN 2 | Sync slave | Protocol bit7 | Cable Length 133 |

At this point steps 302–309, or a portion of them, may be repeated to change configurations of additional trunk groups. After selection of predefined sets of configuration parameters for selected trunk groups, the administrator commands the VRU to exit and save configuration mode by typing the command "done". Upon exiting configuration mode, the newly entered configuration parameters are preferably invoked at 310 by resetting the VRU. This result may also be accomplished by power-cycling the VRU. Upon a reset command, the VRU invokes a server process, to be described, which enables interface unit 224 to communicate with trunk groups coupled to the VRU.

FIG. 3(a) and the accompanying description shows how an administrator may configure selected trunk groups of a VRU by using predefined sets of configuration parameters. Such a procedure is advantageous in situations where trunk groups for a VRU have been added or replaced with different types of trunk groups which operate according to one of the predefined sets of configuration parameters shown above. Under certain situations, it will be desirable to define new sets of parameters in which values for certain or all parameters of one of the predefined sets of parameters are altered in order for the VRU to communicate with a trunk group which operates under parameter values different from the predefined sets shown above. A preferred embodiment advantageously provides mechanisms to enable such modifications. FIG. 3(b) shows the steps taken in a preferred embodiment to perform such modifications.

Steps 321 and 322 operate similarly to steps 301 and 302 in FIG. 3(a). At step 323 the administrator selects a maintenance mode, in which system maintenance functions are performed, by entering the "maint" command or a altered version thereof. At 324 system maintenance options are displayed in the manner shown below:

announce—Enter Configured Auto Announcement Mode.
init—Reinitialize an individual channel.
shutdown—Shutdown the system.
restart—Restart the system.
params—Display & modify trunk parameters.
done—Return to the previous menu.

At 325, the administrator enters the "params" option to display and modify trunk parameters. As shown at 326, the system responds by displaying a list of sub-options for the display and modification of trunk parameters as shown below:

list—Display default values for all parameters.
edit—Modify parameters for a specific trunk type.
new—Copy parameters to a new trunk type.
delete—Delete a trunk type.
done—Return to the previous menu.

At this point an operator wishing to display the default values for each of the configuration parameters within the system will, at 327 select the "list" option shown above. The system responds at 328 by displaying default values for all configuration parameters. A preferred embodiment advantageously contains default values for each parameter defined for trunk groups.

As shown at 329, an administrator wishing to change values of certain or all configuration parameters may then edit a selected set of configuration parameters. As seen in the Example Trunk Type File, values of individual parameters may be individually modified by invoking a text editor of known type which allows creation and modification of text files.

Upon modification of parameters in a configuration file, at 330, a trunk group may be assigned the set of parameters by following the steps shown in FIG. 3(a).

Figure 4:
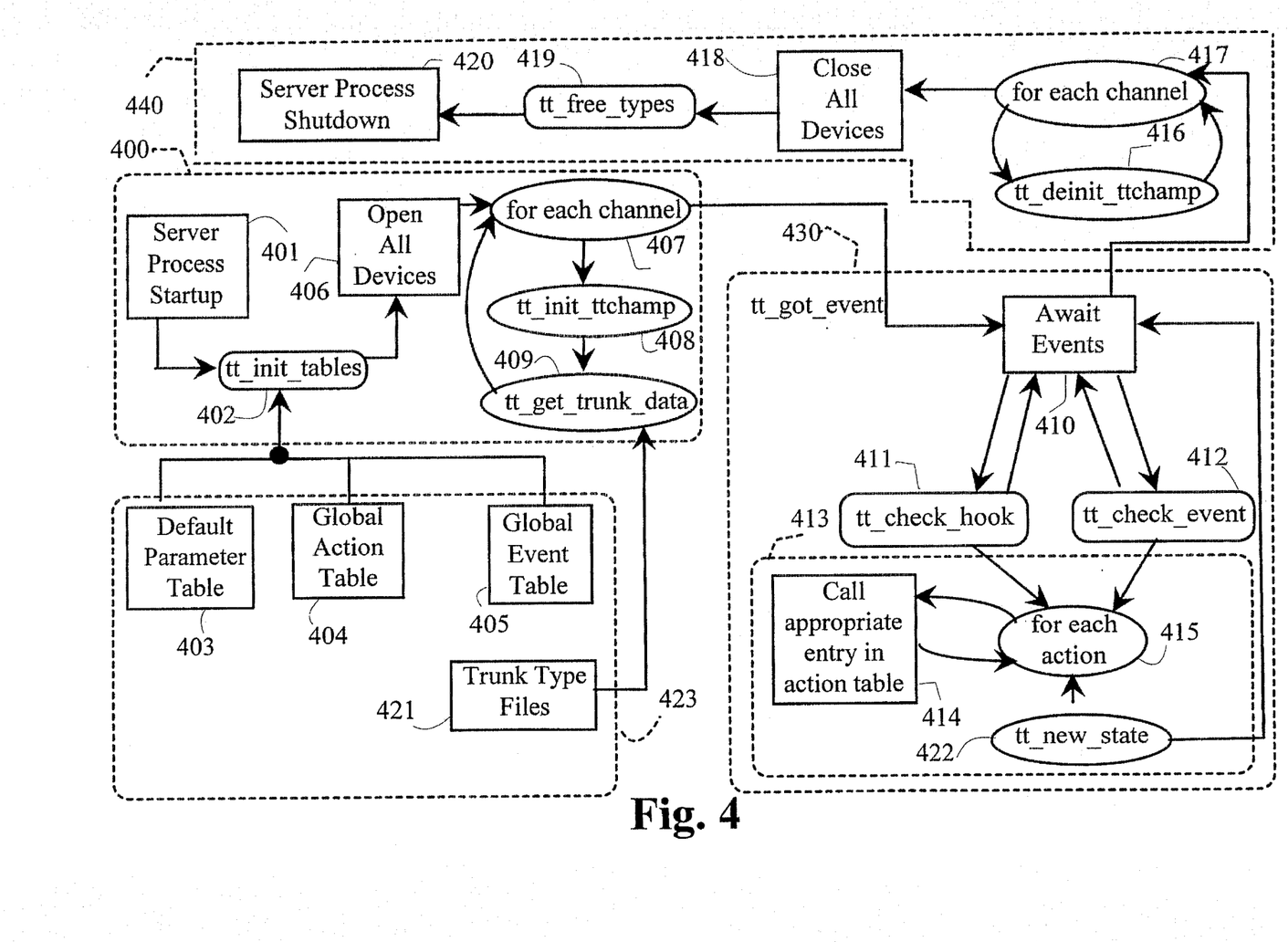
FIG. 4 is a flowchart of a preferred embodiment of the invention.

FIG. 4 of the drawings is a flowchart of the trunk behavior interpreter routine which reads the configuration files known as trunk type files and generates a state machine for each type of channel coupled to the inteface unit. The trunk behavior interactive routine is a library module which reads and executes the specific actions of the trunk behavior definitions. The interpreter routine allows registration of a set of hardware control functions which perform the actual interface manipulations. New hardware control functions need to be added to the base vocabulary each time a new interface class is added but not each time a new interface is defined.

Functions and sub-routines utilized by the trunk behavior interpreter routine are defined and explained below. The following functions and sub-routines are preferably implemented in the C programming language. A C language source code listing for subroutines tt_default.c, dcm_params.c, tt_define.c, tt_params.c, tt_states.c and ttype.h is provided in the attached microfiche appendix. The source code listed in the attached microfiche appendix is executable, upon conversion into an executable module using an appropriate C language compiler/linker available from The Santa Cruz Operation, Inc., Santa Cruz, Calif. 95061, on an Intel 80386 microprocessor, available from Intel Corporation, Santa Clara, Calif. 95052.

In the following description of functions and subroutines utilized by the trunk behavior routine, the function/subroutine is preceded by the return type of the value returned by the function as that return type is understood in the C programming language as defined by Kernighan, B. and Ritchie, D., in *The C Programming Language,* 2d ed., 1988 available from Prentice Hall, Englewood Cliffs, N.J. 07632. Functions/subroutines utilized in the trunk behavior interpreter routine are as follows:

tt_default.c int    tt_set_defl_word(list)
    This function is used to parse a single entry in the
    defaults file 'param = val' the parameter param is
    assigned the value val in the default list.
void    tt_define_defaults(list)
    This function reads the defaults file and for each 'set'
    entry calls tt_set_defl_word
void    tt_get_defaults(fname, list)
    This function opens the defaults file, initializes the token
    stream and calls tt_define_defaults tt_define.c int    tt_get_state(tp, mane)
    This function checks the state list for a trunk type, if the
    state exists it's ID is returned, otherwise a reference is
    created and marked as undefined and the ID of the new
    description is returned.
int    tt_inherit_word(tp)
    This function implements the inherit keyword. The
    current trunk type is overwritten with all of the values
    from the trunk type named by next word. Certain fields
    are preserved such as the name, the reference count and
    the linked list pointers.

-continued

| int | tt_start_word(tp) |
| --- | --- |
| | The next word is interpreted as the name of the state which this trunk type should start in (obtained or created by tt_get_state). |
| int | tt_set_word(tp) |
| | This function is used to parse a set entry in a trunk type. The parameter param is assigned the value val in the trunk types list. |
| int | tt_state_word(tp) |
| | This function is used to parse a state definition in a trunk type. The next word is interpreted as a state name (which is obtained or created with tt_get_state). The word following is the hood state value to assert on state entry which is stored in the state description. The event list is then initialized and tt_define_events is called to parse the event definitions. Once a state has been described it is marked as such. |
| int | tt_define_type(tp) |
| | This function is used to parse a trunk type definition. The function calls each of tt_inherit_word, tt_start_word, tt_set_word and tt_state_word as appropriate to define the different sections of a trunk type and ends processing when the 'end' token is encountered. Upon reaching the 'end' token a check is made to ensure that all states which have been referenced are described. | tt_params.c

| int | tt_init_ttchanp (cp, tp) |
| --- | --- |
| | This function initializes a channels trunk type parameter block. |
| void | tt_deinit_ttchanp (cp) |
| | If space has been allocated for a temporary parameter list it is freed. |
| int | tt_alloc_params (tp) |
| | This function allocates space for a parameter block for the storage of parameters at a trunk type level. All parameters are initialized to the default values supplied in the process parameter list. |
| void | tt_free_params (tp) |
| | This function frees the space allocated for trunk type parameters. |
| int | tt_set_defl_param (list, name, val) |
| | This function sets the value of a parameter in the default parameter list defined for a process. |
| int | tt_get_defl_param (list, name) |
| | This function gets the value of a parameter from the default parameter list defined for a process. |
| int | tt_set_param (tp, name, val) |
| | This function sets the value of a parameter in the parameter block of a trunk type. |
| int | tt_set_temp_param (cp, name, val) |
| | This function sets the value of a parameter in the temporary per channel parameter list. If a temporary parameter list has not been previously allocated one is allocated now. |
| void | tt_reset_params (cp) |
| | This function cancels all temporary parameter values for a channel returning the values to those defined in the parameter block of the trunk type. |
| int | tt_get_param(cp, name) |
| | This function gets the value of a parameter. If a temporary parameter list is present and contains a value for the parameter specified that value is used. Otherwise the value from the parameter block of the trunk type associated with the channel is returned. | tt_read.c

| void | tt_open_words (fp) |
| --- | --- |
| | This function prepares an input file for parsing. |
| void | tt_close_words () |
| | This cleans up the structures used for parsing an input file. |
| char | *tt_next_word () |
| | This function retrieves the next word from the input stream prepared by tt_open_words. |
| void | tt_open_error (fp) |
| void | tt_close_error () |
| void | tl_error (msg) |
| | These functions are used to print error messages. |
| void | tt_open_info (fp) |

| void | tt_close_info () |
| --- | --- |
| void | tt_info (msg) |
| | These functions are used to print progress messages. |
| void | tt_info (msg) |
| | These functions are used to print progress messages. |
| void | tt_get_types (fname) |
| | This function opens a trunk type file and calls tt_open_words to prepare it for parsing. The file is searched for trunk type definitions and for each definition which is encountered, a new trunk type description and parameter block are allocated (with tt_alloc_params) and the definition is parsed by the function tt_define_type. The new definition is then added to the linked list of defined types. After the entire file has been parsed the input stream is closed with tt_close_words. |
| TT_DATA | *tt_get_trunk_data (type, fname) |
| | This function is used to get the description for a named trunk type. First the list of already defined trunk types is searched for the named type and if it found, the type is marked as in use and the description is returned. If the trunk type is not already loaded the trunk type file specified is loaded and all types defined are added to the list using the tt_get_types call. After loading the new file the list is searched again and if the type is found it is marked and returned as above. |
| void | tt_prune_types () |
| | This function traverses the list of defined trunk types and discards the definitions for all trunk types which have been loaded but not used (this allows multiple types to be defined in a single file for inheritance purposes without wasting memory). |
| void | tt_free_types () |
| | This function frees all memory used by all trunk types once they will no longer be required. | tt_states.c

| int | tt_define_actions (ev) |
| --- | --- |
| | This function parses a list of actions defined for a particular event. Each action is found by name in the global action table and the ID of the action is added to the action list for the event being defined. The list of actions is enclosed in parenthesis () and can contain no actions. |
| int | tt_define_events (tp, st) |
| | This function parses a list of events defined for a particular state. Each event is either a hook event (of the form [...] or [.....]) or a named event which is found in the global event list. A new event structure is added to the states event list containing the type and ID or hook mask of the event, the action list to perform upon receiving the event as parsed by the function tt_define_actions, and the next state to go to after processing actions (obtained or created by tt_get_state). A states event list is enclosed in curly braces {} and must contain at least one event. |
| void | tt_init_tables (def_params, def_file, act_table, ev_table) |
| | This function is called to initialize the environment prior to parsing and trunk type files. Pointers to the defaults parameter list, the global action table and the global event table are passed in and the process default file is read to allow any dynamic changes to the parameter default list. |
| char | *tt_state_name (cp) |
| | This function is a debug function which returns the human readable name of the current state a channel is in. |
| void | tt_new_state (fp, state, arg) |
| | This function manages the mechanics of a state change for a specific channel in it's trunk type's state machine. The channel control block is updated, the current asserted hook state is changed to the value assigned on entry to the new state (by calling the defined hook handler) and the new state is checked to see if the current received hook state would trigger an immediate event on the new state. |
| void | tt_got_event (cp, this_ev, arg) |
| | This function manages the processing of a triggered event by sequentially executing all of the appropriate actions and the calling tt_new_state with the state value specified in the events definition. |
| BOOL | tt_check_event (cp, evtype, evcode, arg) |
| | This function is called to determine if a received event |

|  | will trigger in the current state. The even list is traversed and if the named event is encountered tt__got__event is called to process the action list and initiate the transition to a new state. |
|---|---|
| BOOL | tt__check__hook (cp, arg) This function is called to determine if a change in the hook state will trigger as an event in the current state. The event list is traversed and if any hook type events match the mask passed in tt__got__event is called to process the action list and initiate the transition to a new state. |

FIG. 4 is a flow chart of the operation of a server process which operates in block 400 to generate a state machine for each type of channel coupled to the interface unit and in block 430, to receive events occurring upon each channel, take an appropriate action or actions for the received event, and to initiate a new state and process events which occur for the new state. In block 440, upon issuance by the administrator of a shut down command, or upon disconnection of the VRU from a power source, the server process is shut down by releasing space occupied by parameter lists and other data structures in memory which comprise the state machine for each channel, and closing all opened devices.

The trunk behavior interpreter routine is initiated at 401 upon invocation by the system administrator of the server process. At 402, a sub-routine termed tt__init__tables is invoked to initialize and load certain parameters such as pointers: to a default parameter table 403, a global action table 404 and a global event table 405. Default parameter table 403, global action table 404 and global event table 405, along with trunk type files 421, are preferably stored on storage unit 230 and are retrieved into RAM 208 by the operating system which manages control unit 201. Subroutine tt__init__tables operates generally to set up a vocabulary of actions and events required to establish a state machine for each type of channel coupled to the VRU.

At 406 devices used by the server process are opened and at steps 407–409 sub-routines tt__init__ttchanp and tt__get__trunk__data are executed: to determine which trunk type file applies to each channel, to parse and store in memory, commands stored in each trunk type file, to retrieve and store defined parametric values for individual channels, and to generate a state machine which defines parameter values and protocols for each type of channel coupled to the VRU. As seen in the Example Trunk Type File, the state machine defines the event or events to which a channel must respond, defines an action or actions which must be taken in response to an event, and defines the subsequent state in response to the event or events. Subroutine tt__init__ttchanp 408 initializes a parameter block for each channel and subroutine tt__get__trunk__data retrieves data from a corresponding trunk type file 421 for each channel. The server process advantageously generates a state machine for each different type of channel coupled to the VRU. Consequently, if multiple channels have the same trunk type definition, only one state machine is generated for those channels. If at 409 a state machine corresponding to the trunk type in question has not been generated, the trunk type file is retrieved from storage block 421 and a state machine for that trunk type is generated.

Once steps 408 and 409 have been executed for each channel, the VRU is ready for operation and block 430 is entered. The steps in block 430 are performed during operation of the VRU to control telephone calls occurring on channels coupled to the VRU. At step 410, the server process awaits events occurring on any of the channels. Each channel coupled to the VRU has, in a corresponding state machine, a definition for an initial state. The initial state may require occurrence of either a single event or multiple events in order for the actions, if any are defined to be executed, and for a subsequent state to be entered. Steps 410, 411 and 412 operate to detect the occurrence of the necessary event or events required to perform an action in an initial state and for all subsequent states. Upon occurrence of the necessary event(s), steps 414 and 415 operate to perform the defined action(s) for the present state in accordance with any specific parametric values which may be defined for the particular channel. Upon performance of all defined actions in the present state, step 422 operates to advance the state machine in question to the subsequent state defined in the present state. Control is then passed to step 410 to await the events defined for the subsequent state.

Upon entry at the command input unit of a shut down command, or upon detection by the control unit of a loss of power, the server process is advantageously shut down in an orderly manner in the steps shown in block 440. At steps 416 and 417, subroutine tt__deinit__ttchanp is executed to release space in memory allocated for the parameter list of each channel. All devices opened at step 406 are closed at step 418 and at step 419 space in memory allocated for trunk type files is released. The server process is then exited at step 420.

It is to be understood that the specific mechanisms and techniques which have been described are merely illustrative of one application of the principles of the invention. Numerous modifications may be made to the methods and apparatus described without departing from the true spirit and scope of the invention. For example, although the embodiment described has been a voice response unit, the principles of the invention may be applied to other similar systems which do not necessarily receive or transmit voice information over telephone lines. For instance the principles of the invention may be applied to systems, including but not limited to, those which receive or transmit information in other forms such as facsimile type data transmitted and received by fax machines, and those machines which receive video or image data.

What is claimed is:

1. A voice response system comprising:

an interface unit coupled to a plurality of trunk groups each comprising a plurality of channels which each operate in accordance with a set of operating parameters; and a control unit comprising a plurality of trunk type configuration files, each file corresponding to each unique set of operating parameters, each file containing values corresponding to certain operating parameters within said set, and a server process responsive to each unique set of said values contained in a configuration file and to events received over said channels for responding to said events in accordance with said values.

2. A voice response system as set forth in claim 1 wherein the trunk type configuration file is a text type file.

3. A voice response system as set forth in claim 1 wherein each trunk type configuration file is a text type file.

4. A voice response system as set forth in claim 1 wherein the server process comprises, means responsive to a start-up command for establishing a state definition for each type of channel in accordance with a configuration file which corresponds to each type of channel, each of said state definitions having an initial state and a plurality of subsequent states; and means responsive to an event occurring in a channel which is defined in an initial state of said corresponding state definition, for responding to the event and for advancing said corresponding state definition to a subsequent defined state.

5. A voice response system as set forth in claim 1 wherein the values in each of said configuration files provide:

a state machine definition, which defines an initial state and subsequent states which occur to establish a telephone connection between a calling party and a called party, to transfer information between the calling and called party, and to terminate the connection; and a plurality of parameter settings defining the specific operation of a corresponding operating characteristic of a specified trunk group.

6. A voice response system as set forth in claim 5 wherein the voice response system is coupled to a command input system which provides system management commands, selected by a system operator, to said voice response system.

7. A voice response system as set forth in claim 6 wherein the values in said configuration file are selectable via commands entered via the command input unit.

8. A voice response system as set forth in claim 7 wherein the control unit comprises a plurality of predefined sets of configuration data, selectable by said system administrator.

9. A voice response system as set forth in claim 8 wherein a first trunk type configuration file is inheritable by a second trunk type configuration file.

10. A voice response system as set forth in claim 9 further comprising means for allowing said system administrator to modify said values in a trunk type file corresponding to a particular trunk group comprising:

means, responsive to a first user input, for providing a plurality of system management functions;

means, responsive to a second user input, for providing a plurality of system configuration options;

means, responsive to a third user input, for causing display of a selected trunk type file;

means, responsive to a fourth user input, for selecting values for said selected trunk type file; and means, responsive to a fifth user input, for invoking an interpreter which generates a state definition for said selected trunk group in accordance with said values in said selected trunk type file.

11. A voice response system comprising:

an interface unit comprising one or more signal transfer devices which transfer information between said voice response system and one or more carriers of telephone signals;

a storage unit which is coupled to said interface unit and which stores information received by said interface unit;

a control unit which operates to control said voice response system, the control unit comprising, a configuration unit which, in response to stored text-type configuration files, enables said interface unit to exchange information with different types of said carriers of said telephone signals, and a configuration file generation unit for receiving commands entered by an administrator, into a data processor which is coupled to the voice response system via a local area network, to generate said stored text-type configuration files.

12. Apparatus for adapting a message storage system to operate with a plurality of types of trunk groups, comprising:

a system console for displaying system information;

interfacing means responsive to a plurality of configuration parameters, for transferring information between said system and one or more trunk groups in accordance with sets of configuration parameters which characterize operation of different types of said trunk groups;

means for selecting a configuration option from a plurality of system administration options;

means responsive to the selection of said configuration option for displaying current configuration parameters of each of the trunk groups and for selecting a set of parameters for configuration;

means responsive to the selected set of parameters for displaying each of the parameters of said trunk groups and for accepting a command by said operator to change said parameters to one of a plurality of predefined parameters; and means responsive to the selection of a selected set of parameters for one or more trunk groups for providing said interface unit with information indicative of said entered parameters.

13. Apparatus as set forth in claim 12 wherein the means for providing said interface unit with information indicative of said entered parameters comprises a means for interpreting a file containing text data and for generating information to enable said interface means to communicate with a desired trunk line.

14. A voice response system comprising:

a storage unit for storing information, an interface unit, operating in accordance with data and commands received from a control unit, for transferring information between said storage unit and a plurality of trunk groups, which each comprise a plurality of channels, each of said trunk groups being characterized by a plurality of operating parameters, each of said operating parameters for each of said trunk groups having corresponding configuration data, said control unit comprising means responsive to said configuration data for generating a state definition, which defines one of a plurality of control states of said voice response system, for each of said trunk groups; and means responsive to an event received on a channel for responding to the event in accordance with a state definition for the trunk group corresponding to said channel.

15. A voice response system as set forth in claim 14 wherein the configuration data comprises:

a state machine definition, which defines an initial state and subsequent states which occur to establish a telephone connection between a calling party and a called party, to transfer information between the calling and called party, and to terminate the connection; and a plurality of parameter settings defining the specific operation of a corresponding operating characteristic.

16. A voice response system as set forth in claim 15 wherein the voice response system is coupled to a command input unit which provides system management commands, selected by a system operator, to said voice response system.

17. A voice response system as set forth in claim 16 wherein the configuration data is selectable via commands entered via the command input unit.

18. A voice response system as set forth in claim 17 wherein the control unit comprises a plurality of predefined sets of configuration data, selectable by a system administrator.

19. A voice response system as set forth in claim 17 wherein a first set of configuration data is inheritable by a second set of configuration data.

20. A voice response system as set forth in claim 19 further comprising means for allowing said system administrator to select said configuration data for a particular trunk group comprising:

means, responsive to a first user input, for providing a plurality of system management functions;

means, responsive to a second user input, for providing a plurality of system configuration options;

means, responsive to a third user input, for causing display of current configuration data;

means, responsive to a fourth user input, for selecting configuration data for a specified trunk group; and means, responsive to a fifth user input, for invoking an interpreter which generates a state definition for said selected trunk group in accordance with said configuration data.

21. A voice response system as set forth in claim 20 further comprising at least a first transfer module for transferring information between said interface unit and said control unit.

22. A voice response system as set forth in claim 14 further comprising at least a first transfer module for transferring information between said interface unit and said control unit.

23. A voice response system comprising:

an interface unit comprising one or more signal transfer devices which transfer information between said voice response system and one or more carriers of telephone signals;

a storage unit which is coupled to said interface unit and which stores information received by said interface unit;

a control unit which operates to control said voice response system, the control unit comprising, a configuration unit which, in response to stored text-type configuration files, enables said interface unit to exchange information with different types of said carriers of said telephone signals, and a configuration file generation unit for receiving commands entered by an administrator, into a data processor which is coupled to the voice response system via a public switched telephone network, to generate said stored text-type configuration files.

* * * * *